(12) United States Patent
Goodchild

(10) Patent No.: US 11,398,752 B2
(45) Date of Patent: Jul. 26, 2022

(54) ZERO-CROSSING SLOTTED FOREIGN OBJECT DETECTION

(71) Applicant: AIRA, Inc., Chandler, AZ (US)

(72) Inventor: Eric Heindel Goodchild, San Tan Valley, AZ (US)

(73) Assignee: AIRA, INC., Chandler, AZ (US)

( * ) Notice: Subject to any disclaimer, the term of this patent is extended or adjusted under 35 U.S.C. 154(b) by 211 days.

(21) Appl. No.: 16/893,424

(22) Filed: Jun. 4, 2020

(65) Prior Publication Data
US 2021/0384777 A1 Dec. 9, 2021

(51) Int. Cl.
| | |
|---|---|
| *H02J 50/60* | (2016.01) |
| *G01V 3/10* | (2006.01) |
| *H02J 50/12* | (2016.01) |
| *H02J 7/02* | (2016.01) |
| *H02J 50/80* | (2016.01) |

(52) U.S. Cl.
CPC .............. *H02J 50/60* (2016.02); *G01V 3/10* (2013.01); *H02J 7/02* (2013.01); *H02J 50/12* (2016.02); *H02J 50/80* (2016.02)

(58) Field of Classification Search
CPC .... H02J 50/60; H02J 7/02; H02J 50/12; H02J 50/80; H02J 7/025; H02J 5/005; H02J 17/00; H02J 2007/0001; H02J 7/0027; H02J 7/0029; H02J 7/0036; H02J 7/045;
(Continued)

(56) References Cited

U.S. PATENT DOCUMENTS

2012/0256620 A1   10/2012  Oettinger et al.
2014/0084857 A1*  3/2014  Liu ................. H02J 7/0029
                                              320/108
(Continued)

FOREIGN PATENT DOCUMENTS

| CN | 106232420 A | * | 12/2016 | ............ B60L 11/182 |
| WO | WO-2018004120 A1 | * | 1/2018 | ............ H02J 50/60 |
| WO | WO-2021047939 A1 | * | 3/2021 | ............ H02J 50/10 |

OTHER PUBLICATIONS

L. Lan et al., "Foreign Object Detection for Wireless Power Transfer," 2018 2nd URSI Atlantic Radio Science Meeting (AT-RASC), 2018 (Year: 2018).*
(Continued)

*Primary Examiner* — Daniel R Miller
(74) *Attorney, Agent, or Firm* — Loza & Loza, LLP; Anthony Smyth

(57) ABSTRACT

Systems, methods and apparatus for wireless charging are disclosed. A method for operating a charging device includes providing a charging current to a resonant circuit when a receiving device is present on a surface of the wireless charging device, providing a zero-crossing signal that includes edges corresponding to transitions of a voltage measured across the resonant circuit through a zero volt level or to transitions of a current in the resonant circuit through a zero ampere level, providing a measurement slot by decreasing or terminating the charging current for a period of time, and determining whether an object other than the receiving device is present on a surface of the charging device based on measurements of samples of voltage or current captured based on timing provided by the zero-crossing signal, wherein the samples are captured during the measurement slot.

17 Claims, 14 Drawing Sheets

(58) Field of Classification Search
CPC . H02J 50/90; G01V 3/10; G01V 3/104; B60L 11/182; H04B 5/0037
See application file for complete search history.

(56) References Cited

U.S. PATENT DOCUMENTS

| | | |
|---|---|---|
| 2016/0352155 A1 | 12/2016 | Iwasaki |
| 2018/0219421 A1 | 8/2018 | Yang et al. |
| 2020/0136436 A1 | 4/2020 | Goodchild et al. |

OTHER PUBLICATIONS

PCT/US2021/034997, International Search Report & Written Opinion (dated Sep. 14, 2021).

\* cited by examiner

ZERO-CROSSING SLOTTED FOREIGN OBJECT DETECTION

TECHNICAL FIELD

The present invention relates generally to wireless charging of batteries, including batteries in mobile computing devices, and more particularly to detection of foreign objects during a charging operation.

BACKGROUND

Wireless charging systems have been deployed to enable certain types of devices to charge internal batteries without the use of a physical charging connection. Devices that can take advantage of wireless charging include mobile processing and/or communication devices. Standards, such as the Qi standard defined by the Wireless Power Consortium enable devices manufactured by a first supplier to be wirelessly charged using a charger manufactured by a second supplier. Standards for wireless charging are optimized for relatively simple configurations of devices and tend to provide basic charging capabilities.

Improvements in wireless charging capabilities are required to support continually increasing complexity of mobile devices and changing form factors. For example, there is a need for improved wireless transmission power control, including detection of foreign objects that may affect wireless transmission of power when placed on or near a charging device.

DETAILED DESCRIPTION

Figure 1:
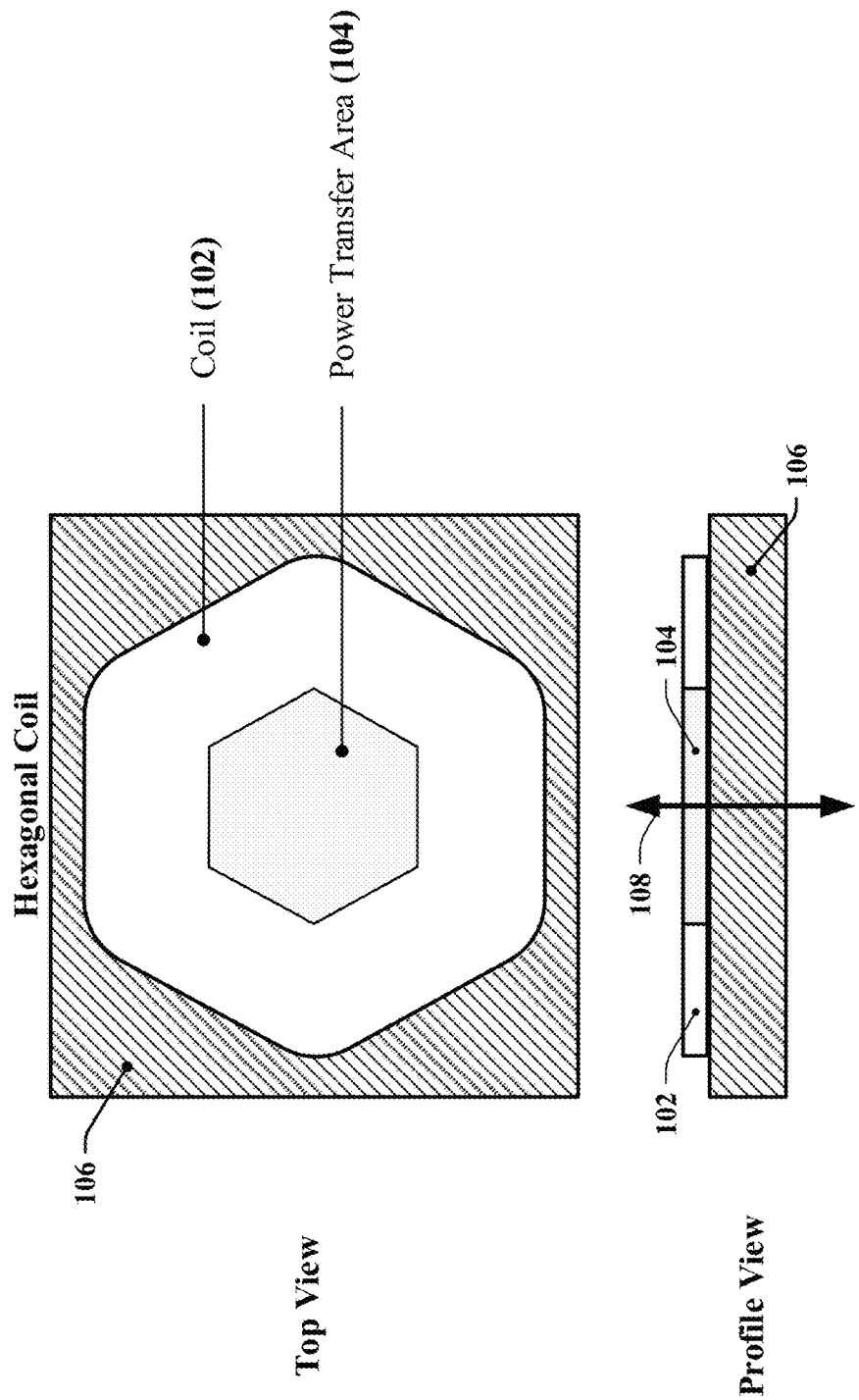
FIG. 1 illustrates an example of a charging cell that may be employed to provide a charging surface in accordance with certain aspects disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of wireless charging systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium. A processor-readable storage medium, which may also be referred to herein as a computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), Near Field Communications (NFC) token, random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Overview

Certain aspects of the present disclosure relate to systems, apparatus and methods applicable to wireless charging devices and techniques. Charging cells may be configured with one or more inductive coils to provide a charging device that can charge one or more devices wirelessly. The location of a device to be charged may be detected through sensing techniques that associate location of a device to changes in a physical characteristic centered at a known location on a surface of the charging device. Sensing of location may be implemented using capacitive, resistive, inductive, touch, pressure, load, strain, and/or another appropriate type of sensing.

In one aspect of the disclosure, an apparatus has a battery charging power source, a plurality of charging cells configured in a matrix, a first plurality of switches in which each switch is configured to couple a row of coils in the matrix to a first terminal of the battery charging power source, and a second plurality of switches in which each switch is configured to couple a column of coils in the matrix to a second terminal of the battery charging power source. Each charging cell in the plurality of charging cells may include one or more coils surrounding a power transfer area. The plurality of charging cells may be arranged adjacent to a surface of the device without overlap of power transfer areas of the charging cells in the plurality of charging cells. Devices placed on the surface may receive power that is wirelessly transmitted through one or more of the charging cells.

In some instances, the apparatus may also be referred to as a charging surface. Power can be wirelessly transferred to a receiving device located anywhere on a surface of the apparatus. The devices can have an arbitrarily defined size and/or shape and may be placed without regard to any discrete placement locations enabled for charging. Multiple devices can be simultaneously charged on a single surface. The apparatus can track motion of one or more devices across the surface.

Certain aspects disclosed herein relate to improved wireless charging techniques. In various aspects of the disclosure, a method for operating a charging device includes providing a charging current to a resonant circuit when a receiving device is present on a surface of the wireless charging device, providing a zero-crossing signal that includes edges corresponding to transitions of a voltage measured across the resonant circuit through a zero volt level or to transitions of a current in the resonant circuit through a zero ampere level, providing a measurement slot by decreasing or terminating the charging current for a period of time, and determining whether an object other than the receiving device is present on a surface of the charging device based on measurements of samples of voltage or current captured based on timing provided by the zero-crossing signal, wherein the samples are captured during the measurement slot.

Charging Cells

According to certain aspects disclosed herein, a charging device may be provided using charging cells that are deployed adjacent to a surface of the charging device. In one example the charging cells are deployed in accordance with a honeycomb packaging configuration. A charging cell may be implemented using one or more coils that can each induce a magnetic field along an axis that is substantially orthogonal to the surface of the charging device and adjacent to the coil. In this description, a charging cell may refer to an element having one or more coils where each coil is configured to produce an electromagnetic field that is additive with respect to the fields produced by other coils in the charging cell, and directed along or proximate to a common axis.

In some implementations, a charging cell includes coils that are stacked along a common axis and/or that overlap such that they contribute to an induced magnetic field substantially orthogonal to the surface of the charging device. In some implementations, a charging cell includes coils that are arranged within a defined portion of the surface of the charging device and that contribute to an induced magnetic field within the substantially orthogonal portion of the surface of the charging device associated with the charging cell. In some implementations, charging cells may be configurable by providing an activating current to coils that are included in a dynamically-defined charging cell. For example, a charging device may include multiple stacks of coils deployed across a surface of the charging device, and the charging device may detect the location of a device to be charged and may select some combination of stacks of coils to provide a charging cell adjacent to the device to be charged. In some instances, a charging cell may include, or be characterized as a single coil. However, it should be appreciated that a charging cell may include multiple stacked coils and/or multiple adjacent coils or stacks of coils.

FIG. 1 illustrates an example of a charging cell 100 that may be deployed and/or configured to provide a charging device. In this example, the charging cell 100 has a substantially hexagonal shape that encloses one or more coils 102 constructed using conductors, wires or circuit board traces that can receive a current sufficient to produce an electromagnetic field in a power transfer area 104. In various implementations, some coils 102 may have a shape that is substantially polygonal, including the hexagonal charging cell 100 illustrated in FIG. 1. Other implementations may provide coils 102 that have other shapes. The shape of the coils 102 may be determined at least in part by the capabilities or limitations of fabrication technology, and/or to optimize layout of the charging cells on a substrate 106 such as a printed circuit board substrate. Each coil 102 may be implemented using wires, printed circuit board traces and/or other connectors in a spiral configuration. Each charging cell 100 may span two or more layers separated by an insulator or substrate 106 such that coils 102 in different layers are centered around a common axis 108.

Figure 2:
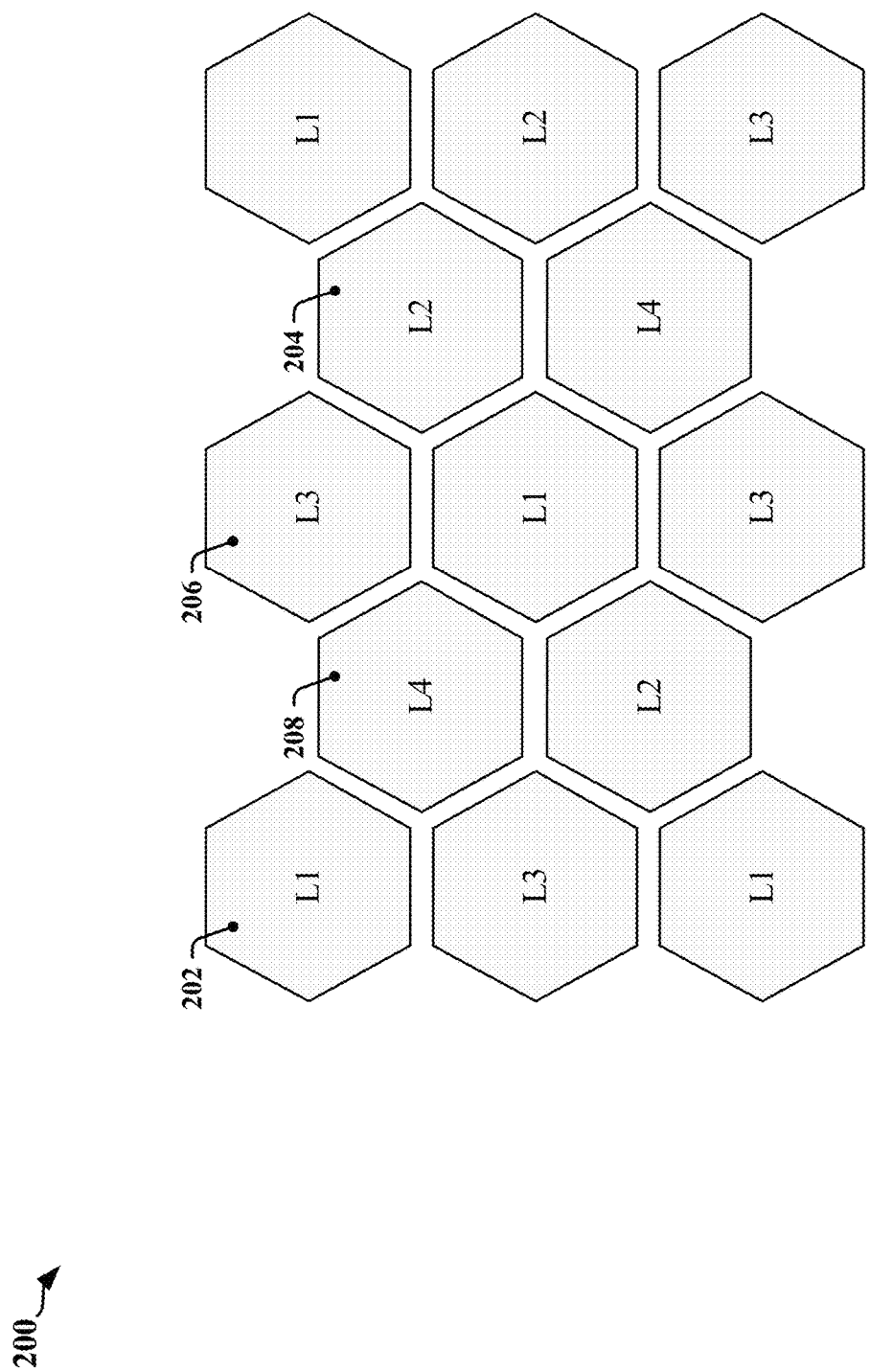
FIG. 2 illustrates the arrangement of power transfer areas provided by a charging surface that employs multiple layers of charging cells configured in accordance with certain aspects disclosed herein.

FIG. 2 illustrates the arrangement of power transfer areas provided across a surface 200 of the charging device that employs multiple layers of charging cells configured in accordance with certain aspects disclosed herein. The charging device may be constructed from four layers of charging cells 202, 204, 206, 208. In FIG. 2, each power transfer area provided by a charging cell in the first layer of charging cells 202 is marked "L1", each power transfer area provided by a charging cell in the second layer of charging cells 204 is marked "L2", each power transfer area provided by a charging cell in the third layer of charging cells 206, 208 is marked "L3", and each power transfer area provided by a charging cell in the first layer of charging cells 208 is marked "L4".

Figure 3:
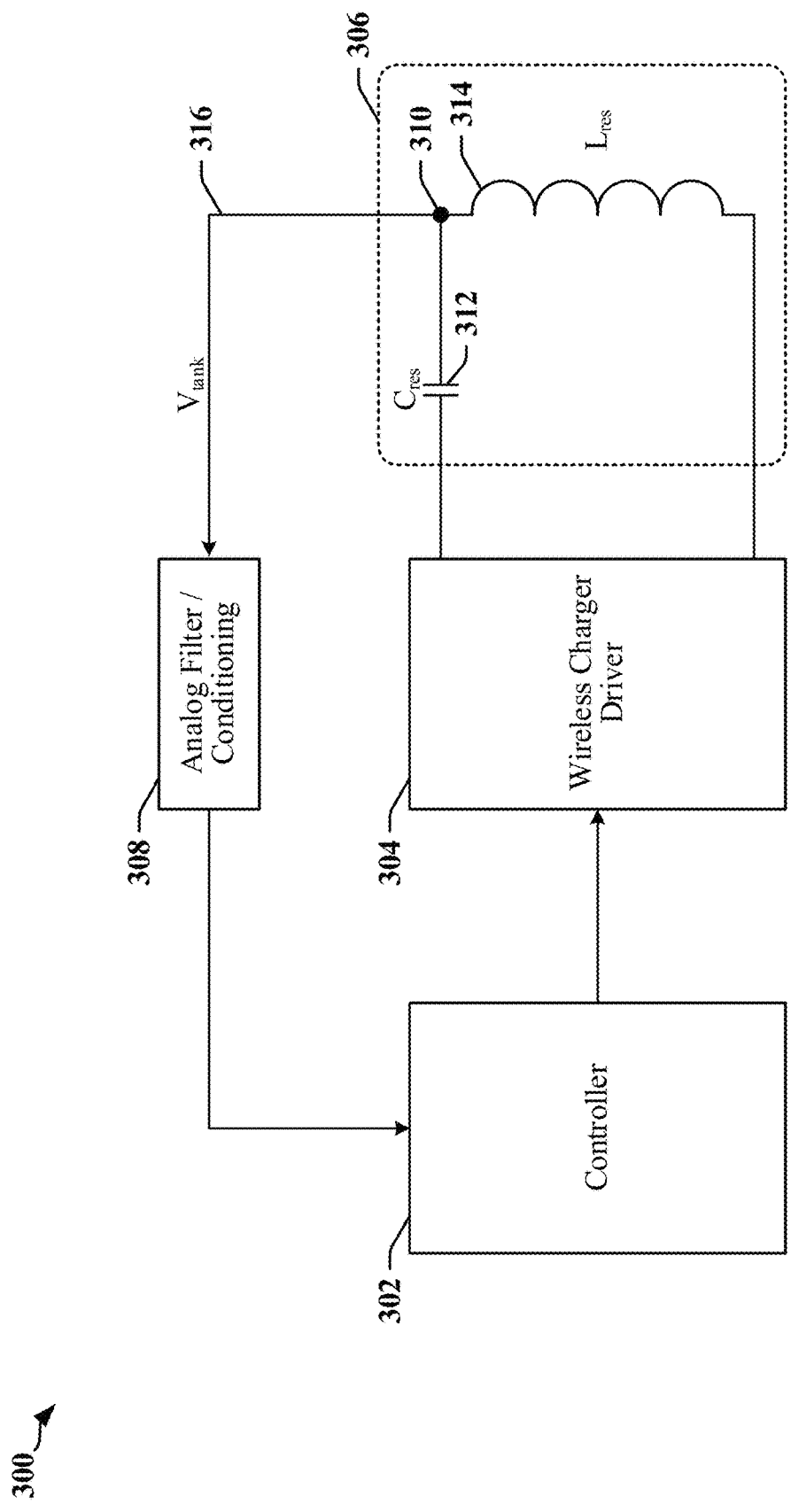
FIG. 3 illustrates a wireless transmitter that may be provided in a charger base station in accordance with certain aspects disclosed herein.

FIG. 3 illustrates a wireless transmitter 300 that may be provided in a charger base station. A controller 302 may receive a feedback signal filtered or otherwise processed by a filter circuit 308. The controller may control the operation of a driver circuit 304 that provides an alternating current (AC) signal to a resonant circuit 306 that includes a capacitor 312 and inductor 314. The resonant circuit 306 may also be referred to herein as a tank circuit, an LC tank circuit and/or as an LC tank, and the voltage 316 measured at an LC node 310 of the resonant circuit 306 may be referred to as the tank voltage.

The wireless transmitter 300 may be used by a charging device to determine if a compatible device has been placed on a surface of the charging device. For example, the charging device may determine that a compatible device has been placed on the surface of the charging device by sending an intermittent test signal (active ping) through the wireless transmitter 300, where the resonant circuit 306 may receive encoded signals when a compatible device responds to the test signal. The charging device may be configured to activate one or more coils in at least one charging cell after receiving a response signal defined by standard, convention, manufacturer or application. In some examples, the compatible device can respond to a ping by communicating received signal strength such that the charging device can find an optimal charging cell to be used for charging the compatible device.

Passive ping techniques may use the voltage and/or current measured or observed at the LC node 310 to identify the presence of a receiving coil in proximity to the charging pad of a device adapted in accordance with certain aspects disclosed herein. In many conventional wireless charger transmitters, circuits are provided to measure voltage at the LC node 310 or the current in the network. These voltages and currents may be monitored for power regulation purposes and/or to support communication between devices. In the example illustrated in FIG. 3, voltage at the LC node 310 is monitored, although it is contemplated that current may additionally or alternatively be monitored to support passive ping. A response of the resonant circuit 306 to a passive ping (initial voltage $V_0$) may be represented by the voltage ($V_{LC}$) at the LC node 310, such that:

$$V_{LC} = V_0 e^{-\left(\frac{\omega}{2Q}\right)t} \quad \text{(Eq. 1)}$$

According to certain aspects disclosed herein, coils in one or more charging cells may be selectively activated to provide an optimal electromagnetic field for charging a compatible device. In some instances, coils may be assigned to charging cells, and some charging cells may overlap other charging cells. In the latter instances, the optimal charging configuration may be selected at the charging cell level. In other instances, charging cells may be defined based on placement of a device to be charged on a surface of the charging device. In these other instances, the combination of coils activated for each charging event can vary. In some implementations, a charging device may include a driver circuit that can select one or more cells and/or one or more predefined charging cells for activation during a charging event.

Phase Modulated Charging

Figure 4:
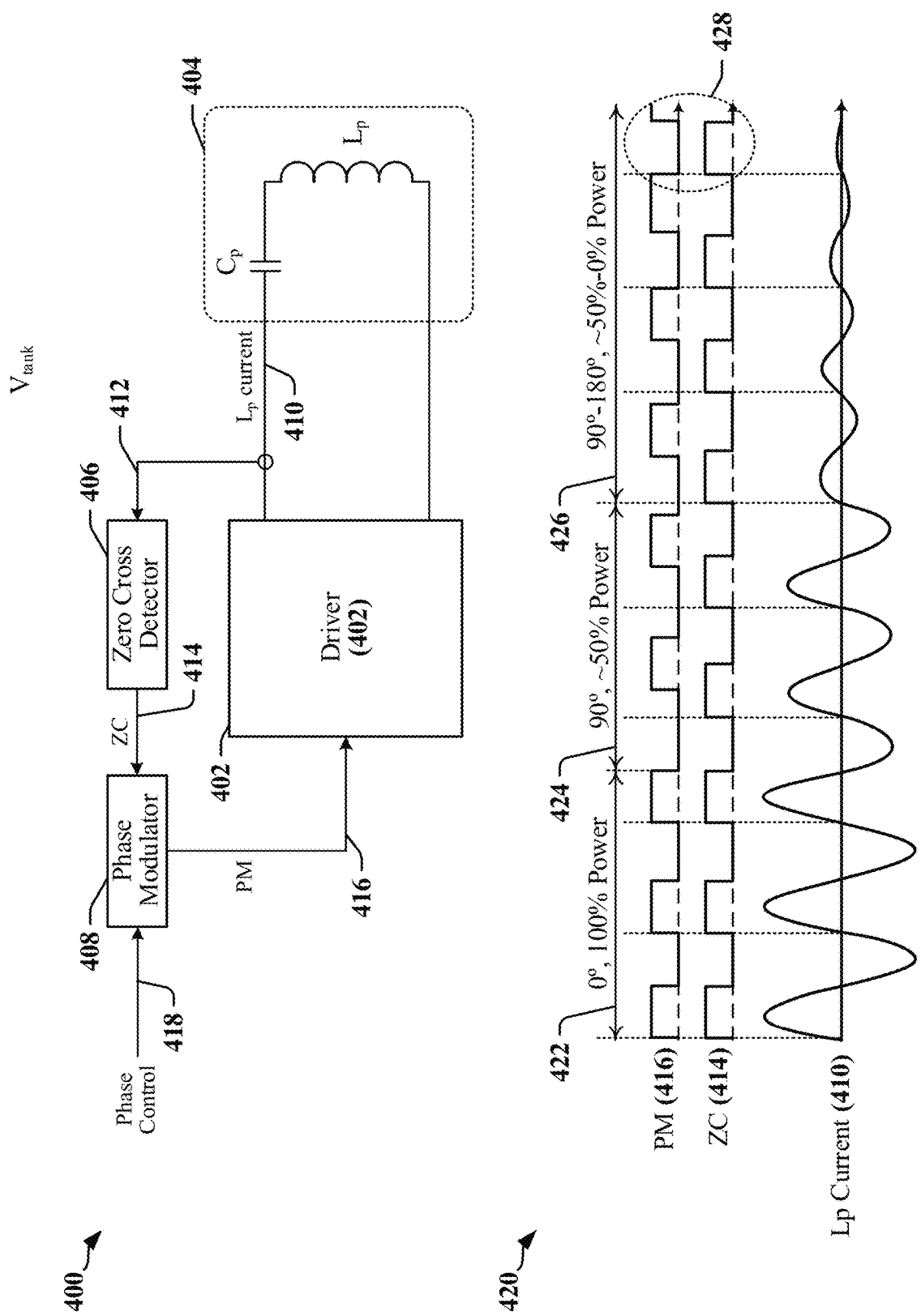
FIG. 4 illustrates a phase-modulated wireless charger configured in accordance with certain aspects of this disclosure.

One aspect of this disclosure relates to the use of a phase-modulated wireless charger 400, an example of which is illustrated in FIG. 4. A driver circuit 402 provides a charging current 410 to a resonant circuit 404 that includes a capacitor ($C_p$) and an inductor ($L_p$). The charging current 410 may be substantially the same as the current in the inductor (i.e., the $L_p$ current), although some portion of the charging current 410 may be lost due to parasitic capacitance, or the like. The charging current 410 alternates at a frequency that may be closely matched to the resonant frequency of the resonant circuit 404 to improve efficiency of power transfer. In accordance with certain aspects of this disclosure, the level of power transferred through the resonant circuit 404 to a receiving device may be controlled through phase modulation of the charging current 410.

The timing diagram 420 illustrates certain aspects of phase modulation as applied to the charging current 410 in certain implementations. Phase modulation enables fine control over the level of power delivery by the driver circuit 402. The timing diagram 420 depicts three charging periods 422, 424 and 426 in which power is delivered at different levels, as indicated by the varying amplitude of the charging current 410.

Phase control is obtained using a zero-crossing detector 406 and a phase modulator 408 that responds to a phase control signal 418 provided by a controller or other processor. The zero-crossing detector 406 is used to provide timing information used by the phase modulator 408. In one example, the zero-crossing detector 406 may compare polarity of a measurement signal 412 representing the current flowing to the resonant circuit 404 with polarity of a delayed version of the measurement signal 412, whereby a difference in polarity is detected when a zero-crossing occurs in the measurement signal 412. The zero-crossing detector 406 provides a zero-crossing signal 414 (ZC) that includes timing information identifying zero-crossings of the measurement signal 412. In one example, the zero-crossing signal 414 includes an edge for each zero-crossing of the measurement signal 412. Direction of transition of the edge may indicate positive-going or negative-going zero-crossings. In another example, the zero-crossing signal 414 includes a pulse for each zero-crossing of the measurement signal 412.

The phase modulator 408 uses the zero-crossing signal 414 to generate a phase modulation signal 416. The phase modulation signal 416 may change the phase of a modulated current that contributes to the charging current 410. The phase of the modulated current with respect to the phase of the current in the resonant circuit can cause an increase or decrease in the charging current 410. In the first charging period 422, the phase modulation signal 416 is closely synchronized to the zero-crossing signal 414, and the effect of the modulated current is additive over each cycle of the charging current 410. In this example, the driver circuit 402 provides maximum power transfer through the resonant circuit 404. In the second charging period 424, the phase modulation signal 416 has a phase shift of 90° with respect to the zero-crossing signal 414, and the effect of the modulated current is additive and subtractive on alternating quarter cycles. In this example, the driver circuit 402 provides 50% of the maximum available power through the resonant circuit 404. In the third charging period 426, the phase modulation signal 416 has a phase shift with respect to the zero-crossing signal 414 that increases from 90° to 180° in the last-depicted cycle 428. The effect of the modulated current is negative over an increasing portion of each cycle of the charging current 410 and driver circuit 402 provides power through the resonant circuit 404 that decreases from 50% of the maximum available power to no power transfer or minimal power transfer.

In certain implementations, the zero-crossing signal 414 is provided as a digital signal that provides the timing needed by the phase modulator 408 to add a phase-lead or phase-lag to the incoming zero-cross signal when indicated by the phase control signal 418. In one example, the driver circuit 402 includes a half-bridge circuit. In one example, the phase control signal 418 is a multi-bit digital signal that indicates the amount of phase shift to be added to the zero-crossing signal 414 in order to directly affect the amount of power that flows in the resonant circuit 404 (i.e., Lp and Cp).

Resonant Pulse-Width Modulation

Figure 5:
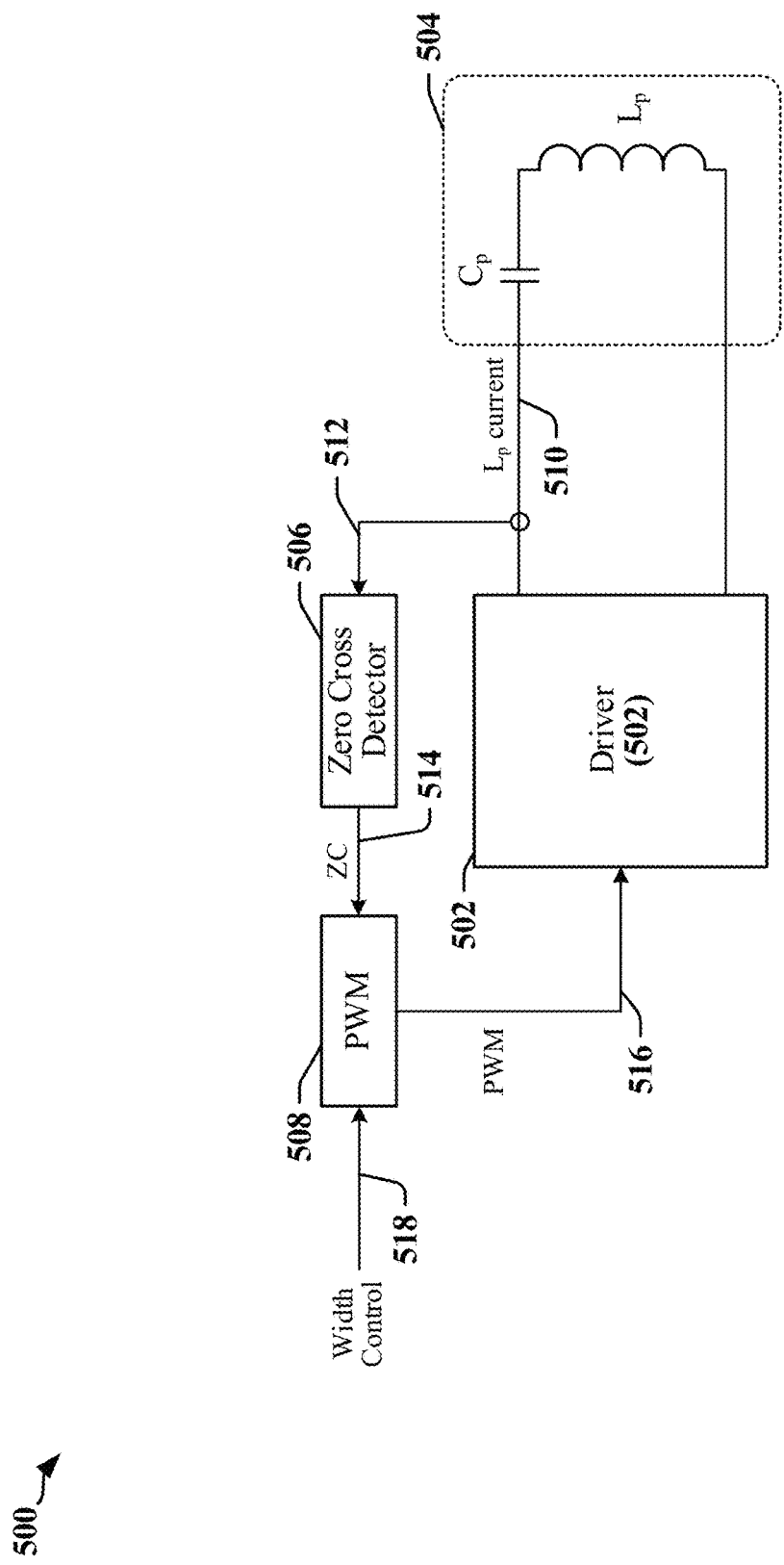
FIG. 5 illustrates an example of a pulse-width modulation charger configured in accordance with certain aspects of this disclosure.
Figure 6:
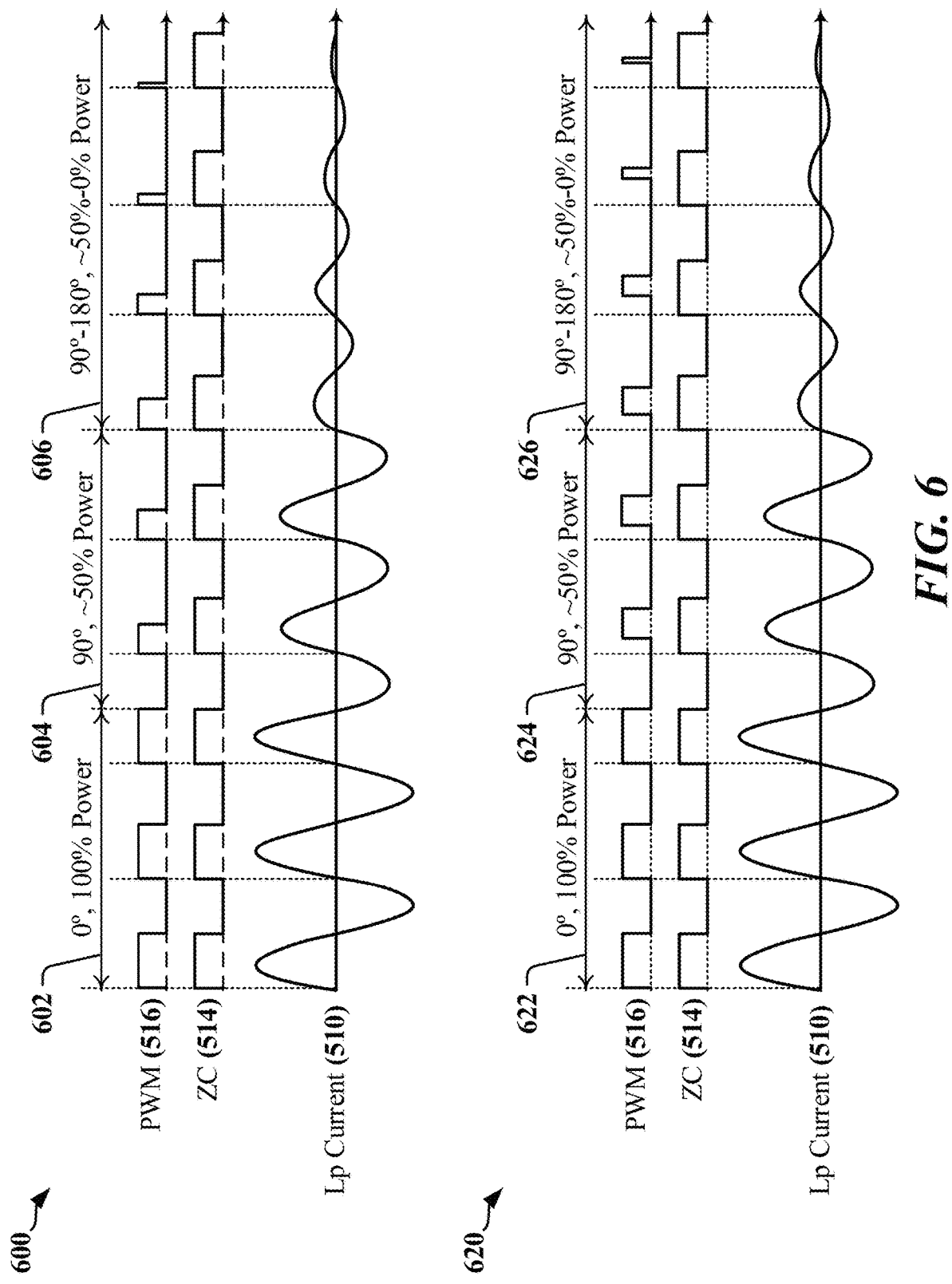
FIG. 6 illustrate the operation of the pulse-width modulation charger of FIG. 5.

FIG. 5 illustrates an example of a PWM charger 500 and the timing diagrams 600, 620 in FIG. 6 illustrate certain aspects of the operation of the PWM charger 500. One aspect of this disclosure relates to the use of a pulse-width modulation (PWM) charging system to modulate a charging current 510 provided to a resonant circuit 504. A driver circuit 502 provides a charging current 510 to a resonant circuit 504 that includes a capacitor ($C_p$) and an inductor ($L_p$). The charging current 510 may be substantially the same as the current in the inductor (i.e., the $L_p$ current), although some portion of the charging current 510 may be lost due to parasitic capacitance, or the like. The charging current 510 alternates at a frequency that may be closely matched to the resonant frequency of the resonant circuit 504 to improve efficiency of power transfer. In accordance with certain aspects of this disclosure, the level of power transferred through the resonant circuit 504 to a receiving device may be controlled using PWM modulation to alter the charging current 510.

The timing diagrams 600, 620 illustrate certain aspects of PWM as applied to the charging current 510 in certain implementations. PWM enables fine control over the level of power delivery by the driver circuit 502, although the timing diagrams 600, 620 depict a limited number of charging periods 602, 604, 606, 622, 624 and 626 in which power is delivered at different levels, as indicated by the varying amplitude of the charging current 510.

The power provided in the charging current 510 may be controlled using a zero-crossing detector 506 and a PWM circuit 508 that responds to a control signal 518 provided by a controller or other processor. The zero-crossing detector 506 is used to provide timing information used by the PWM circuit 508. In one example, the zero-crossing detector 506 may compare the polarity of a measurement signal 512 representing the current flowing to the resonant circuit 504 with the polarity of a delayed version of the measurement signal 512, whereby a difference in polarity is detected when a zero-crossing occurs in the measurement signal 512. The zero-crossing detector 506 provides a zero-crossing signal 514 (ZC) that includes timing information identifying zero-crossings of the measurement signal 512. In one example, the zero-crossing signal 514 includes an edge for each zero-crossing of the measurement signal 512. Direction of transition of the edge may indicate positive-going or negative-going zero-crossings. In another example, the zero-crossing signal 514 includes a pulse for each zero-crossing of the measurement signal 512.

The PWM circuit 508 uses the zero-crossing signal 514 to generate a PWM signal 516. The PWM signal 516 may control the contribution of energy to the charging current 510. In one example, pulses in the PWM signal 516 are used to gate a current that is provided to a power inverter circuit that produces an alternating output used to provide the charging current 510.

In the first charging period 602, 622, the PWM signal 516 includes pulses that match the duration of a half-cycle of the charging current 510, and provides a charging current 510 with maximum (100%) power. In this example, the driver circuit 502 provides maximum power transfer through the resonant circuit 504. In the second charging period 604, 624, the PWM signal 516 includes pulses that have a duration of approximately half the duration of a half-cycle of the charging current 510, and the resultant charging current 510 with provides 50% of the maximum available power when provided to the resonant circuit 504. In the third charging period 606, 626, the PWM signal 516 includes pulses that decrease, initially having a duration of approximately half the duration of a half-cycle of the charging current 510, and decreasing to almost an absence of a pulse. The driver circuit 502 provides power through the resonant circuit 504 that decreases from 50% of the maximum available power to no or minimal power transfer.

The timing of the pulses in the PWM signal 516 may be selected based on the method of generating the charging current 510 used in the driver circuit 502. In the example illustrated by the first timing diagram 600 of FIG. 6, each pulse is initiated at a zero crossing and has a duration that may be determined by the width control signal 518. The width control signal 518 may be provided as a multi-bit digital signal that configures a programmable delay circuit or selects an out of a delay line to provide a delay that determines the duration of a pulse in the width control signal 518.

In the example illustrated by the second timing diagram 620 of FIG. 6, each pulse in the PWM signal 516 is centered on the mid-point of a corresponding pulse in the zero-crossing signal 514. In other words, the center of each pulse is midway between zero crossings of the measurement signal 512. The duration of these pulses may be determined by the width control signal 518. The width control signal 518 may be provided as a multi-bit digital signal that configures a programmable delay circuit or selects an out of a delay line to provide a delay that determines the duration of a pulse in the width control signal 518. The location of the pulses may be configured using counters, delay lines, lookup tables and/or other circuits. Centering the pulses in the PWM signal 516 between zero crossings of the measurement signal 512 can lower distortion of the AC signal in the charging current 510.

In some implementations, resonant pulse width modulation may use a detected zero-crossing as a temporal reference to initiate a PWM drive cycle. In one example, a timer may be started to control with width of the pulse. In another example, a delay circuit may be used to control with width of the pulse. The charging current 510 flowing in the resonant circuit 504 is controlled by the width of the pulse.

In some implementations, PWM may be used to control the charging current 510 flowing in the resonant circuit 504 without zero-crossing synchronization. Accordingly, a current measurement circuit and a zero-crossing detector 506 may not be necessary, provided other information is known, including the values of $L_p$ and $C_p$, for example.

Resonant Class-D Wireless Transmitter

Figure 7:
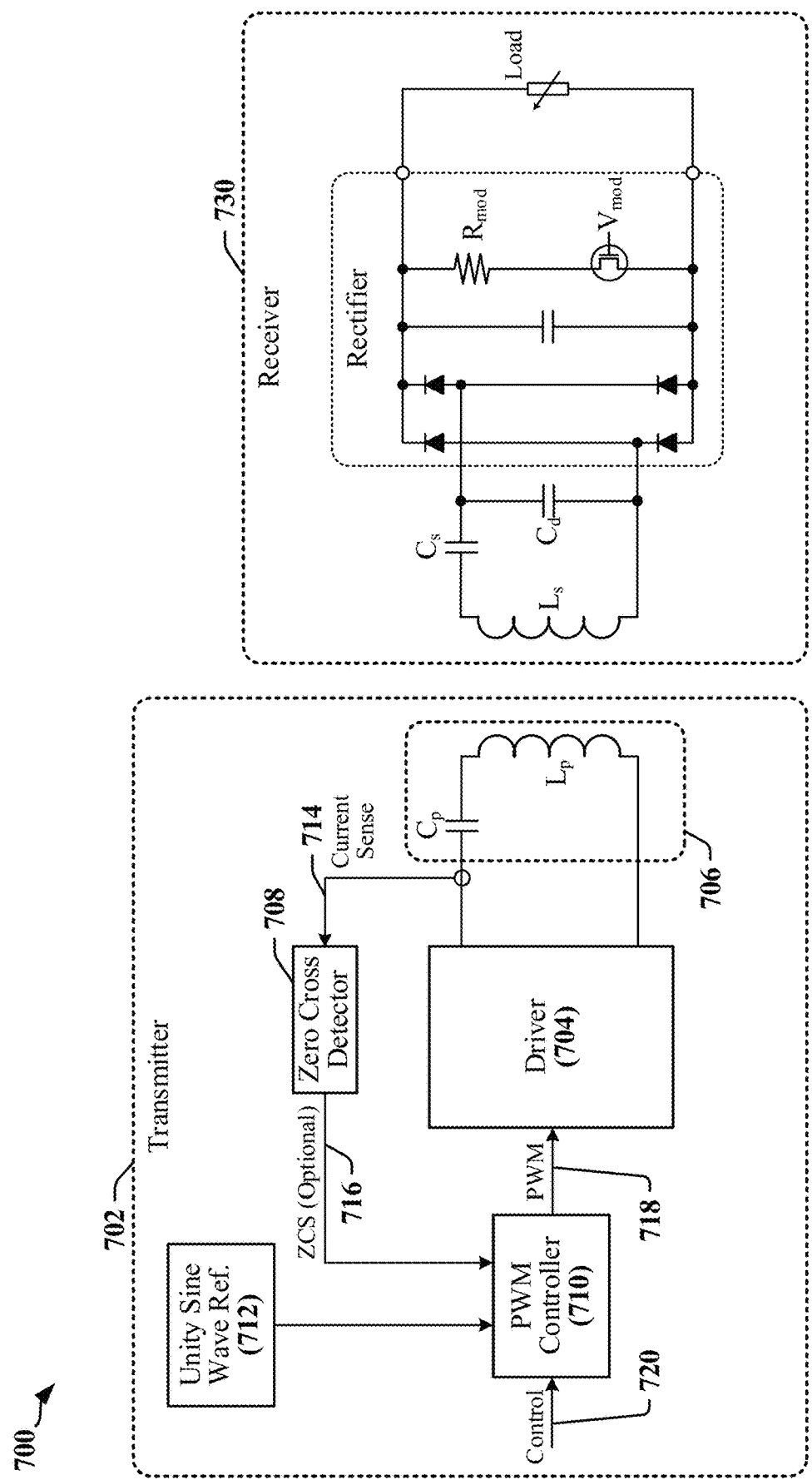
FIG. 7 illustrates an example of a wireless charging system that employs a class-D wireless transmitter configured in accordance with certain aspects disclosed herein.
Figure 8:
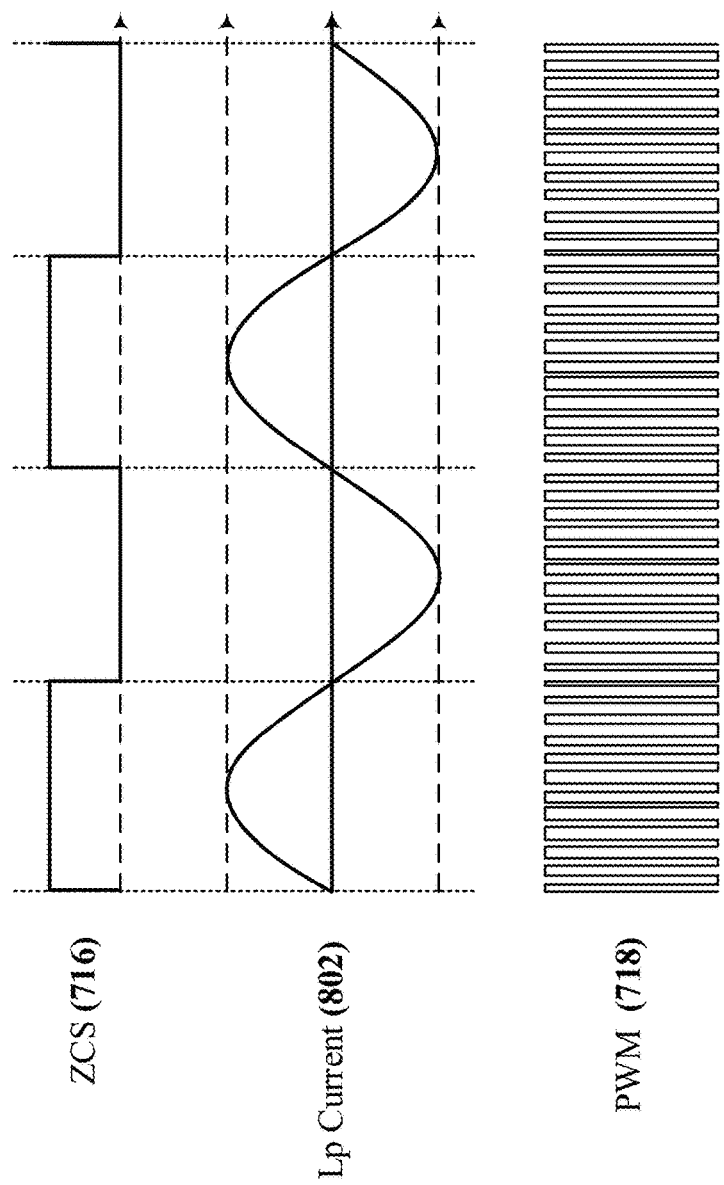
FIG. 8 illustrate the operation of the class-D wireless transmitter of FIG. 7.

FIG. 7 illustrates an example of a wireless charging system 700 that employs a class-D wireless transmitter 702 provided in accordance with certain aspects disclosed herein. The timing diagram 800 in FIG. 8 illustrate certain aspects of the operation of the class-D wireless transmitter 702. The class-D wireless transmitter 702 includes a class-D amplifier that operates as a switching amplifier. The class-D wireless transmitter 702 generates a first signal that switches between voltage rails at a first frequency. The first signal is modulated by a second lower-frequency signal. In the illustrated example, the first signal is pulse-width modulated to obtain a PWM signal 718.

The PWM signal 718 is provided to a driver circuit 704 that generates a charging current to drive a resonant circuit 706 that includes an LC tank circuit including a capacitor ($C_p$) and an inductor ($L_p$). The charging current may be substantially the same as the current in the inductor (i.e., the $L_p$ current 802). The resonant circuit 706 operates as a low-pass filter that converts the high frequency PWM signal 718 to obtain an amplified version of the modulating signal, which may be a sine wave. The PWM controller 710 may be operated to control the peak amplitude of the $L_p$ current 802 using cumulative scaling in order to control the power transmitted to a wireless receiver 730. For example, wider pulses in the PWM signal 718 may correspond to peaks in the $L_p$ current 802 amplitude.

The power provided by the driver circuit 704 may be controlled using a zero-crossing detector 708 and the PWM controller 710, which may respond to a control signal 720 provided by a controller or other processor. The PWM controller 710 receives a sinusoidal signal from a reference source 712 that provides a carrier signal that can be PWM modulated. The zero-crossing detector 708 is used to provide timing information used by the PWM controller 710. In one example, the zero-crossing detector 708 may compare the polarity of a measurement signal 714 representing the current flowing to the resonant circuit 706 with the polarity of a delayed version of the measurement signal 714, whereby a difference in polarity is detected when a zero-crossing occurs in the measurement signal 714. The zero-crossing detector 708 provides a zero-crossing signal 716 (ZCS) that includes timing information identifying zero-crossings of the measurement signal 714. In one example, the zero-crossing signal 716 includes an edge for each zero-crossing of the measurement signal 714. Direction of transition of the edge may indicate positive-going or negative-going zero-crossings. In another example, the zero-crossing signal 716 includes a pulse for each zero-crossing of the measurement signal 714. The PWM controller 710 may use the zero-crossing signal 716 to generate a PWM signal 718, in which the PWM signal 718 is in phase alignment with the $L_p$ current 802.

Zero-Crossing Slotted Foreign Object Detection

Slotted foreign object detection may be used to detect a foreign object (FO) on the surface of a wireless charging device. A driver circuit in the wireless charging device is periodically turned off for a short period of time, which may be referred to as a slot, during which the energy in a resonant circuit driven by the driver circuit is allowed to decay. The Q factor of the resonant circuit can be determined by measuring the rate of decay. A high sample rate is typically required to accurately measure the AC waveform in the tank circuit without aliasing or artifacts that may spoil the measurement accuracy of the Q factor. The sample rate can be a factor of ten to twenty times the frequency of the current in the resonant circuit, and generally requires the use of a fast and expensive analog-to-digital converter (ADC).

In certain aspects of the disclosure, a zero-crossing detector is used to provide timing information that permits a low-cost ADC to reliably obtain an accurate measurement of the voltage at the same point in each cycle of the AC waveform in the resonant circuit, during a slot provided for foreign object detection. Zero crossing slotted foreign object detection can be used to detect the zero crossing of either the voltage and/or the current in the resonant circuit. The detection of the zero crossing starts a hold-off timer that triggers a sample and hold circuit in the ADC. In one example, the hold-off timer triggers the sample and hold circuit after a quarter cycle of the AC waveform in the resonant circuit. In this example, the ADC reads a sample taken at the peak of the AC wave. A sample frequency that is less than the fundamental frequency of the AC waveform can be used.

Figure 9:
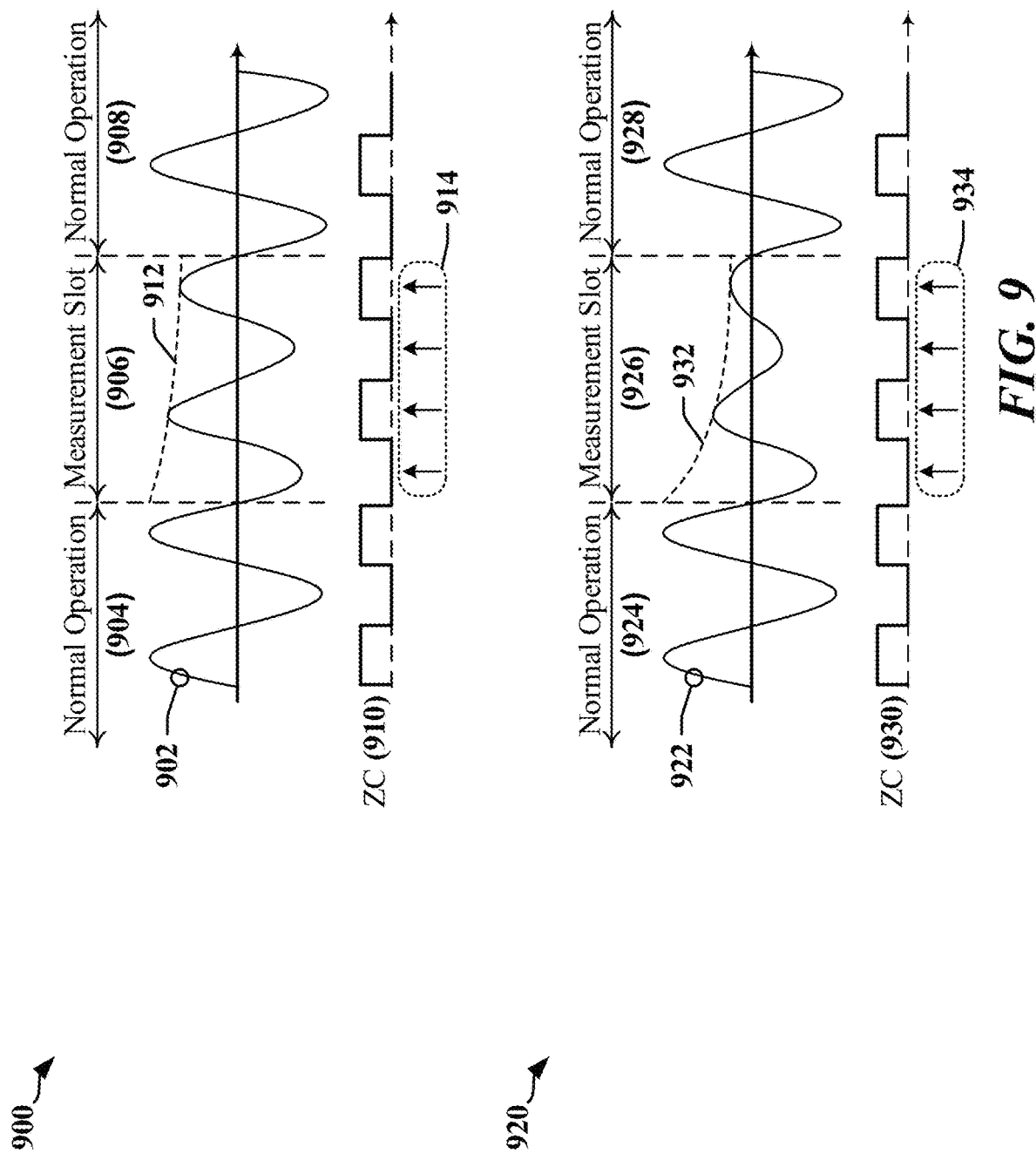
FIG. 9 illustrates zero-crossing, slotted foreign object detection in accordance with certain aspects of the disclosure.

FIG. 9 includes timing diagrams 900, 920 that illustrate certain aspects of a zero-crossing, slotted foreign object detection. A measurement slot 906, 926 is provided between periods 904, 908 or 924, 928 of normal charging operation. The first timing diagram 900 relates to an example of a signal 902 representing energy, voltage or current in the resonant circuit when no foreign object is present, and the slow decay 912 in the signal 902 corresponds to a resonant circuit with a high Q factor. The second timing diagram 920 relates to an example of a signal 922 representing energy, voltage or current in the resonant circuit when a foreign object 1030 (see FIG. 10) is present, and the decay 932 corresponds to a resonant circuit with a low Q factor. A zero-crossing, slotted foreign object detection technique according to certain aspects of the disclosure uses sample points 914, 934 identified based on detected zero crossings identified by a zero-crossing signal 910, 930.

Figure 10:
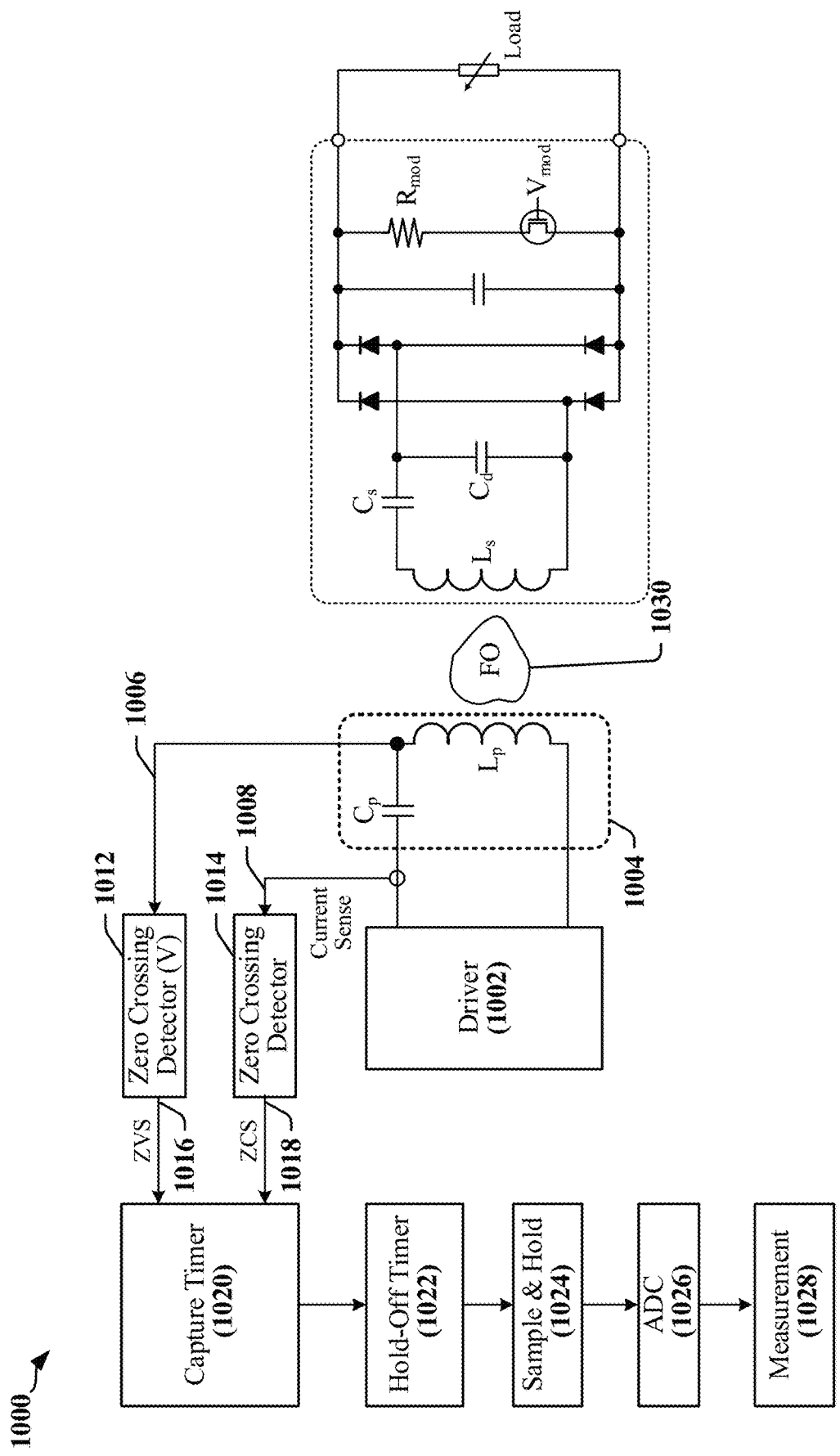
FIG. 10 illustrates a wireless charging system that employs zero-crossing detection to obtain measurements at one or more points in each cycle of current or voltage in a resonant circuit in accordance with certain aspects of the disclosure.

FIG. 10 illustrates an example of a wireless charging system 1000 that employs zero-crossing detection to obtain measurements 1028 at one or more points in each cycle of current or voltage in a resonant circuit 1004. In one example, the measurements may be used for slotted foreign object detection in accordance with certain aspects disclosed herein. The wireless charging system 1000 includes a driver circuit 1002 that generates a charging current to drive a resonant circuit 1004 that includes an LC tank circuit including a capacitor ($C_p$) and an inductor ($L_p$). The charging current may be substantially the same as the current in the inductor. In some implementations, a voltage measurement signal 1006 representative of the voltage across the resonant circuit 1004 is provided to a first zero-crossing detector 1012. The first zero-crossing detector 1012 produces an output 1016 (ZVS) indicating the timing of zero-crossings of the voltage across the resonant circuit 1004. In some implementations, a current measurement signal 1008 representative of the current in the resonant circuit 1004 is provided to a second zero-crossing detector 1014. The second zero-crossing detector 1014 produces an output 1018 (ZCS) indicating the timing of zero-crossings of the current in the resonant circuit 1004.

A capture timing circuit 1020 may be used to track zero crossings and determine or manage the sample and hold circuit 1024. In one example, the capture timing circuit 1020 may include or use a hold-off timer 1022 that can locate the peak amplitude of the voltage or current across the resonant circuit 1004 that occurs after period of time corresponding to a half cycle of the resonant circuit 1004. In other examples, the capture timing circuit 1020 may include or use a hold-off timer 1022 that can locate one or more points of the voltage or current across the resonant circuit 1004. The sample and hold circuit 1024 provides an output digitized by the ADC 1026 to obtain a measurement 1028. The measurement 1028 may be used to track the rate of decay of the energy in the resonant circuit 1004.

Zero-Crossing Amplitude Shift Key Demodulation

The measurements obtained using the zero-crossing detection techniques illustrated in FIG. 10 may be used for Amplitude Shift Keying (ASK) demodulation. ASK modulation is commonly used to carry messages defined by the Qi protocol, which is used for wirelessly interconnecting a power transmitter to a power receiver. The Qi protocol permits the power receiver to control the power transmitter wirelessly. The measurements 1028 obtained at one or more points in each cycle of current or voltage in a resonant circuit 1004 may be used for ASK demodulation. One or more zero-crossing detectors 1012, 1014 provide reference timing for sampling voltage or current associated with the resonant circuit 1004. Sampled data can be used to extract the ASK data that is modulated on the carrier power signal by the receiving device.

Data can be extracted from signals that have much higher frequencies than the sampling frequency when zero cross detection is used to provide timing for sampling. In some instances, sampling can be performed at the fundamental frequency of the current or voltage associated with the resonant circuit 1004, or at double the frequency of the current or voltage associated with the resonant circuit 1004. Conventional sampling circuits operate at ten times the fundamental frequency of the current or voltage associated with the resonant circuit 1004 or more to avoid aliasing and other distortion artifacts.

In one example, ASK demodulation is performed using measurements of voltage captured using timing provided by the output 1016 (ZVS) of the first zero-crossing detector 1012 to time the trigger of a sample and hold circuit 1024. In another example, ASK demodulation is performed using measurements of current captured using timing provided by the output 1018 (ZCS) of the second zero-crossing detector 1014 to time the trigger of a sample and hold circuit 1024. ASK demodulation can be performed using a single sample taken at the peak of a cycle of voltage or current. Zero-crossing ASK demodulation can reject any communications channels that may be in the same domain, provided the phase and/or frequency of the interfering carrier is different from the target carrier.

Figure 11:
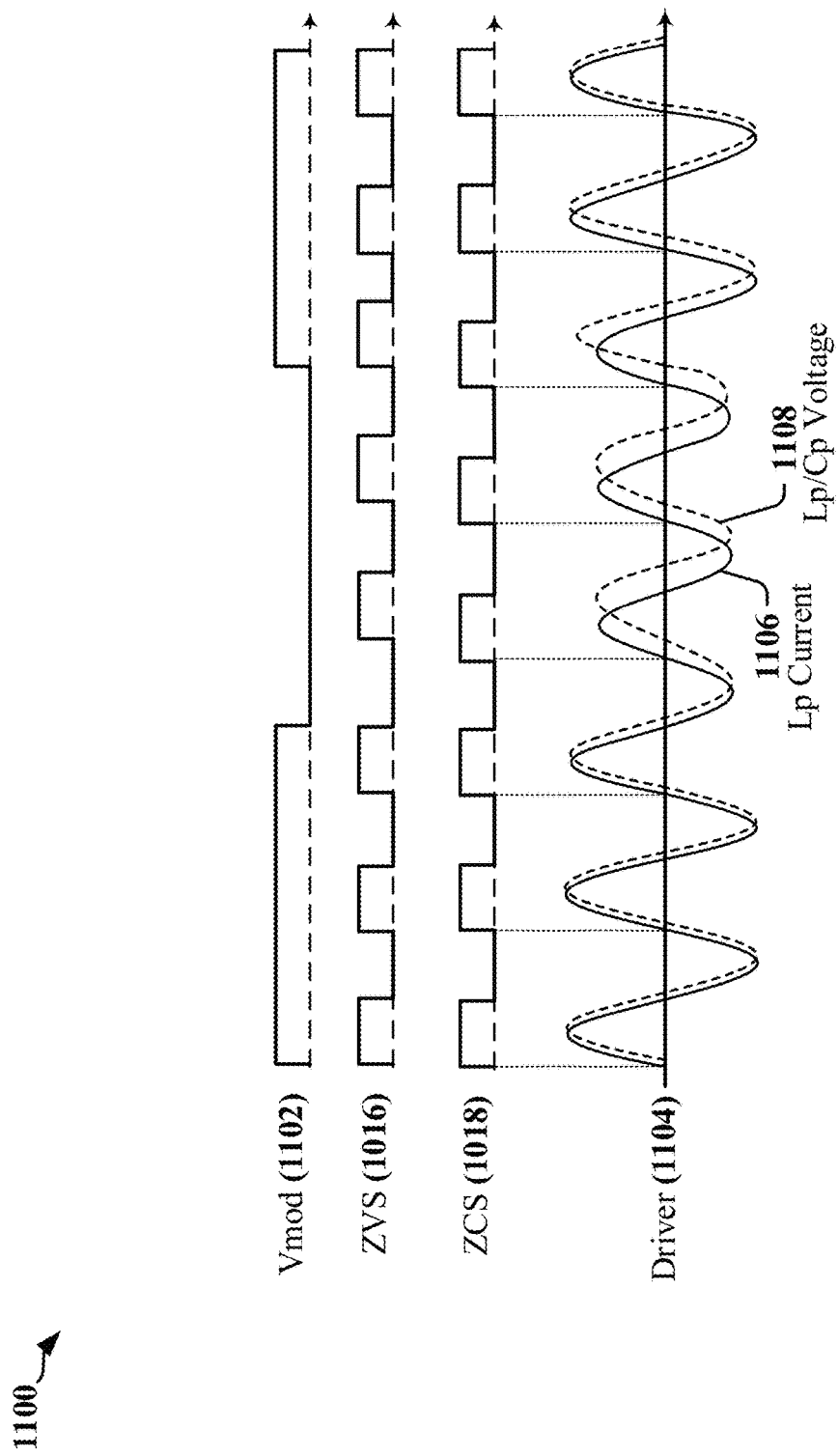
FIGS. 11 and 12 illustrate phase-based ASK demodulation that supports using zero-crossing detection in a wireless charging system configured in accordance with certain aspects of the disclosure.
Figure 12:
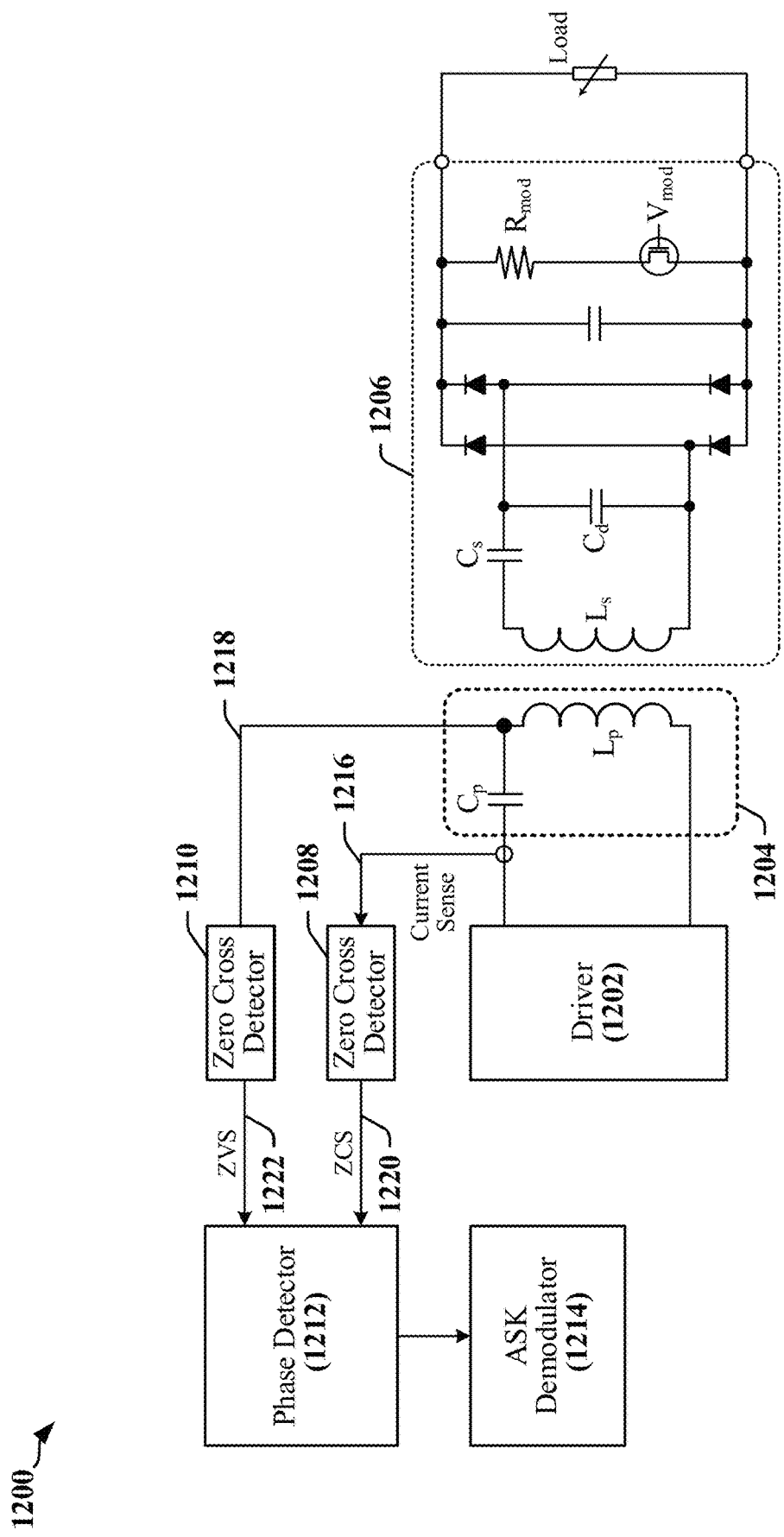

FIGS. 11 and 12 illustrate an example of a wireless charging system 1200 that employs zero-crossing detection to support phase-based ASK demodulation. Referring to the timing diagram 1100 of FIG. 11, zero-crossing phase demodulation includes detecting the phase difference between zero-volt crossings of the voltage 1108 and the current 1106 in the resonant circuit 1204. Phase shifts between the voltage 1108 and the current 1106 may correspond to different modulation levels 1102 when the power receiving device 1206 uses ASK modulation to encode data through load or resonance shift. A digital phase detector 1212 can determine the phase difference between a current zero-crossing signal 1220 (ZCS) and a voltage zero-crossing signal 1222 (ZVS) provided by corresponding zero-crossing detector circuits 1208, 1210 respectively. Phase differences can be measured at one or more points in each cycle of current or voltage in a resonant circuit 1204. The wireless charging system 1200 includes a driver circuit 1202 that generates a charging current 1104 to drive the resonant circuit 1204, which includes a capacitor ($C_p$) and an inductor ($L_p$). The charging current 1104 may be substantially the same as the current in the inductor. In some implementations, a voltage measurement signal 1218 representative of the voltage across the resonant circuit 1204 is provided to a first zero-crossing detector 1210. The first zero-crossing detector 1210 produces an output (ZVS) indicating the timing of zero-crossings of the voltage across the resonant circuit 1204. A current measurement signal 1216 representative of the current in the resonant circuit 1204 is provided to a second zero-crossing detector 1208. The second zero-crossing detector 1208 produces an output (ZCS) indicating the timing of zero-crossings of the current in the resonant circuit 1204.

The phase detector circuit 1212 provides a signal representative of the phase difference between the current zero-crossing signal 1220 (ZCS) and the voltage zero-crossing signal 1222 (ZVS) to an ASK demodulator 1214.

Example of a Processing Circuit

Figure 13:
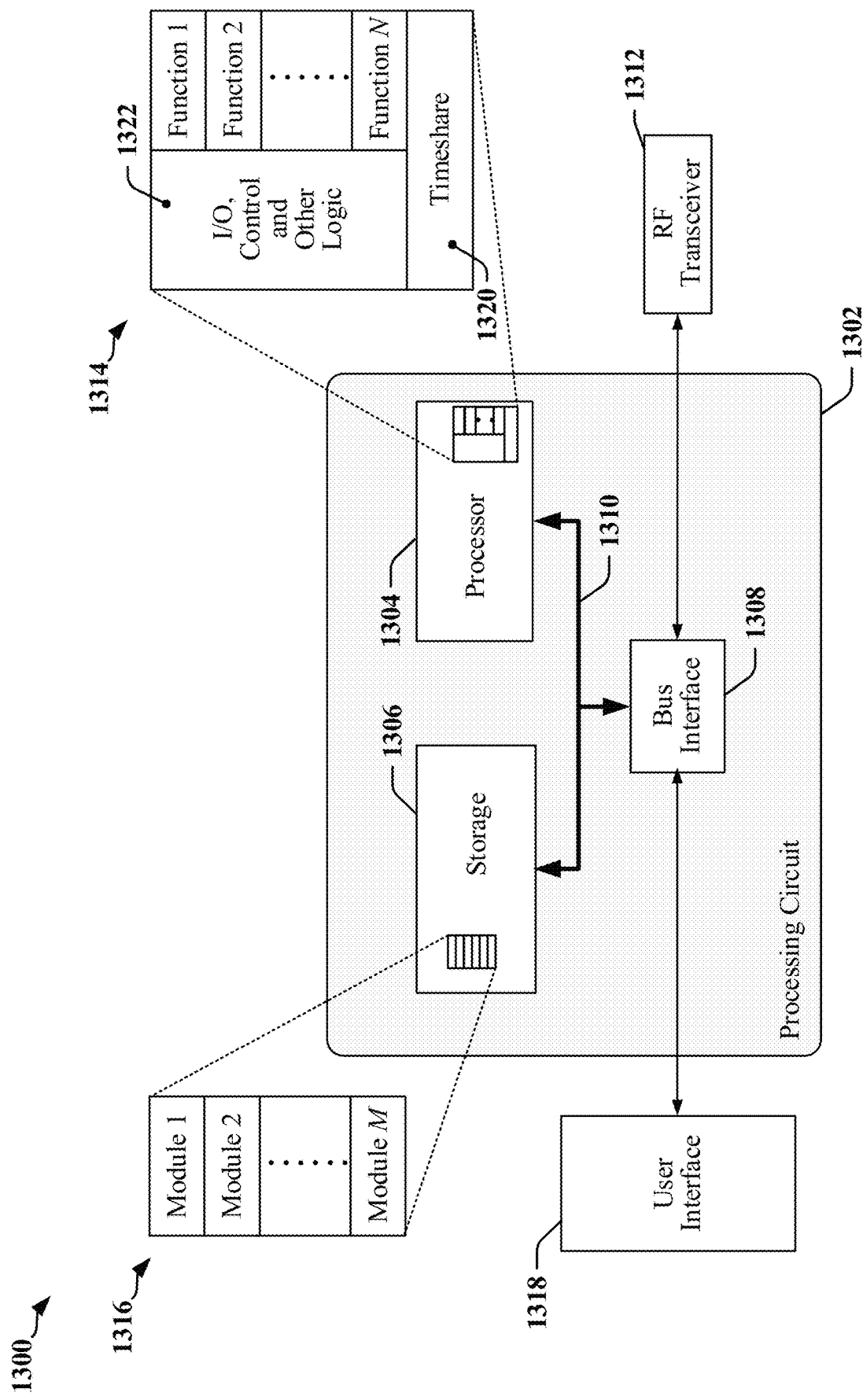
FIG. 13 illustrates one example of an apparatus employing a processing circuit that may be adapted according to certain aspects disclosed herein.

FIG. 13 illustrates an example of a hardware implementation for an apparatus 1300 that may be incorporated in a charging device or in a receiving device that enables a battery to be wirelessly charged. In some examples, the apparatus 1300 may perform one or more functions disclosed herein. In accordance with various aspects of the disclosure, an element, or any portion of an element, or any combination of elements as disclosed herein may be implemented using a processing circuit 1302. The processing circuit 1302 may include one or more processors 1304 that are controlled by some combination of hardware and software modules. Examples of processors 1304 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1304 may include specialized processors that perform specific functions, and that may be configured, augmented or controlled by one of the software modules 1316. The one or more processors 1304 may be configured through a combination of software modules 1316 loaded during initialization, and further configured by loading or unloading one or more software modules 1316 during operation.

In the illustrated example, the processing circuit 1302 may be implemented with a bus architecture, represented generally by the bus 1310. The bus 1310 may include any number of interconnecting buses and bridges depending on the specific application of the processing circuit 1302 and the overall design constraints. The bus 1310 links together various circuits including the one or more processors 1304, and storage 1306. Storage 1306 may include memory devices and mass storage devices, and may be referred to herein as computer-readable media and/or processor-readable media. The storage 1306 may include transitory storage media and/or non-transitory storage media.

The bus 1310 may also link various other circuits such as timing sources, timers, peripherals, voltage regulators, and power management circuits. A bus interface 1308 may provide an interface between the bus 1310 and one or more transceivers 1312. In one example, a transceiver 1312 may be provided to enable the apparatus 1300 to communicate with a charging or receiving device in accordance with a standards-defined protocol. Depending upon the nature of the apparatus 1300, a user interface 1318 (e.g., keypad, display, speaker, microphone, joystick) may also be provided, and may be communicatively coupled to the bus 1310 directly or through the bus interface 1308.

A processor 1304 may be responsible for managing the bus 1310 and for general processing that may include the execution of software stored in a computer-readable medium that may include the storage 1306. In this respect, the processing circuit 1302, including the processor 1304, may be used to implement any of the methods, functions and techniques disclosed herein. The storage 1306 may be used for storing data that is manipulated by the processor 1304 when executing software, and the software may be configured to implement any one of the methods disclosed herein.

One or more processors 1304 in the processing circuit 1302 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1306 or in an external computer-readable medium. The external computer-readable medium and/or storage 1306 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1306 may also include, by way of example, a carrier wave, a transmission line, and any other suitable medium for transmitting software and/or instructions that may be accessed and read by a computer. Computer-readable medium and/or the storage 1306 may reside in the processing circuit 1302, in the processor 1304, external to the processing circuit 1302, or be distributed across multiple entities including the processing circuit 1302. The computer-readable medium and/or storage 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1306 may maintain and/or organize software in loadable code segments, modules, applications, programs, etc., which may be referred to herein as software modules 1316. Each of the software modules 1316 may include instructions and data that, when installed or loaded on the processing circuit 1302 and executed by the one or more processors 1304, contribute to a run-time image 1314 that controls the operation of the one or more processors 1304. When executed, certain instructions may cause the processing circuit 1302 to perform functions in accordance with certain methods, algorithms and processes described herein.

Some of the software modules 1316 may be loaded during initialization of the processing circuit 1302, and these software modules 1316 may configure the processing circuit 1302 to enable performance of the various functions disclosed herein. For example, some software modules 1316 may configure internal devices and/or logic circuits 1322 of the processor 1304, and may manage access to external devices such as a transceiver 1312, the bus interface 1308, the user interface 1318, timers, mathematical coprocessors, and so on. The software modules 1316 may include a control program and/or an operating system that interacts with interrupt handlers and device drivers, and that controls access to various resources provided by the processing circuit 1302. The resources may include memory, processing time, access to a transceiver 1312, the user interface 1318, and so on.

One or more processors 1304 of the processing circuit 1302 may be multifunctional, whereby some of the software modules 1316 are loaded and configured to perform different functions or different instances of the same function. The one or more processors 1304 may additionally be adapted to manage background tasks initiated in response to inputs from the user interface 1318, the transceiver 1312, and device drivers, for example. To support the performance of multiple functions, the one or more processors 1304 may be configured to provide a multitasking environment, whereby each of a plurality of functions is implemented as a set of tasks serviced by the one or more processors 1304 as needed or desired. In one example, the multitasking environment may be implemented using a timesharing program 1320 that passes control of a processor 1304 between different tasks, whereby each task returns control of the one or more processors 1304 to the timesharing program 1320 upon completion of any outstanding operations and/or in response to an input such as an interrupt. When a task has control of the one or more processors 1304, the processing circuit is effectively specialized for the purposes addressed by the function associated with the controlling task. The timesharing program 1320 may include an operating system, a main loop that transfers control on a round-robin basis, a function that allocates control of the one or more processors 1304 in accordance with a prioritization of the functions, and/or an interrupt driven main loop that responds to external events by providing control of the one or more processors 1304 to a handling function.

In one implementation, the apparatus 1300 includes or operates as a wireless charging apparatus that has a battery charging power source coupled to a charging circuit, a plurality of charging cells and a controller, which may be included in one or more processors 1304. The plurality of charging cells may be configured to provide a charging surface. At least one transmitting coil may be configured to direct an electromagnetic field through a charge transfer area of each charging cell. The apparatus 1300 may include a resonant circuit comprising a transmitting coil, a driver circuit configured to provide a charging current to the resonant circuit, and a zero-crossing detector configured to provide a zero-crossing signal that includes edges corresponding to transitions of a voltage measured across the resonant circuit through a zero volt level or corresponding to transitions of a current in the resonant circuit through a zero ampere level. The controller may be configured to cause the driver circuit to provide the charging current to the resonant circuit when a receiving device is present on a surface of the charging device, provide a measurement slot by causing the driver circuit to decrease or terminate the charging current for a period of time, and determine whether an object other than the receiving device is present on a surface of the charging device based on measurements of samples of voltage or current captured based on timing provided by the zero-crossing signal. The samples may be captured during the measurement slot.

In one example, the zero volt level corresponds to a current amplitude midway between maximum and minimum amplitudes of an AC measured in the resonant circuit. The zero volt level may correspond to a voltage level midway between maximum and minimum amplitudes of an AC voltage measured across the resonant circuit.

In one example, the controller is further configured to determine that the object other than the receiving device is present on the surface of the charging device based on a rate of decrease in voltage or current measured using the samples of voltage or current. In one example, the controller is further configured to determine that the object other than the receiving device is present on the surface of the charging device based on a rate of decrease of energy stored in the resonant circuit. The energy stored in the resonant circuit may be indicated by the samples of voltage or current.

In one example, the controller is further configured to determine that the object other than the receiving device is present on the surface of the charging device based on a Q factor of the resonant circuit. The Q factor of the resonant circuit may be indicated by a plurality of the samples of voltage or current.

In certain examples, apparatus 1300 may include a sample and hold circuit configured to sample the voltage or current in the resonant circuit after a delay following each of a plurality of edges in the zero-crossing signal to obtain the samples of voltage or current. The delay may be calculated to cause sampling of the voltage or current when the voltage or current has a maximum amplitude.

In some implementations, the storage 1306 maintains instructions and information where the instructions are configured to cause the one or more processors 1304 to provide a charging current to a resonant circuit when a receiving device is present on a surface of the wireless charging device, provide a zero-crossing signal that includes edges corresponding to transitions of a voltage measured across the resonant circuit through a zero volt level or to transitions of a current in the resonant circuit through a zero ampere level, provide a measurement slot by decreasing or terminating the charging current for a period of time, and determine whether an object other than the receiving device is present on a surface of the charging device based on measurements of samples of voltage or current captured based on timing provided by the zero-crossing signal. The samples may be captured during the measurement slot.

In one example, the zero volt level corresponds to a current amplitude midway between maximum and minimum amplitudes of an AC current measured in the resonant circuit. In another example, the zero volt level corresponds to a voltage level midway between maximum and minimum amplitudes of an AC voltage measured across the resonant circuit. In some instances, it may be determined that the object other than the receiving device is present on the surface of the charging device based on a rate of decrease in voltage or current measured using the samples of voltage or current.

In some instances, it may be determined that the object other than the receiving device is present on the surface of the charging device based on a rate of decrease of energy stored in the resonant circuit. The energy stored in the resonant circuit may be indicated by the samples of voltage and/or current.

In some instances, it may be determined that the object other than the receiving device is present on the surface of the charging device based on a Q factor of the resonant circuit. The Q factor of the resonant circuit may be indicated by a plurality of the samples of voltage or current.

In certain examples, the voltage or current in the resonant circuit may be sampled after a delay following each of a plurality of edges in the zero-crossing signal to obtain the samples of voltage or current. The delay may be calculated to cause sampling of the voltage or current when the voltage or current has a maximum amplitude.

Figure 14:
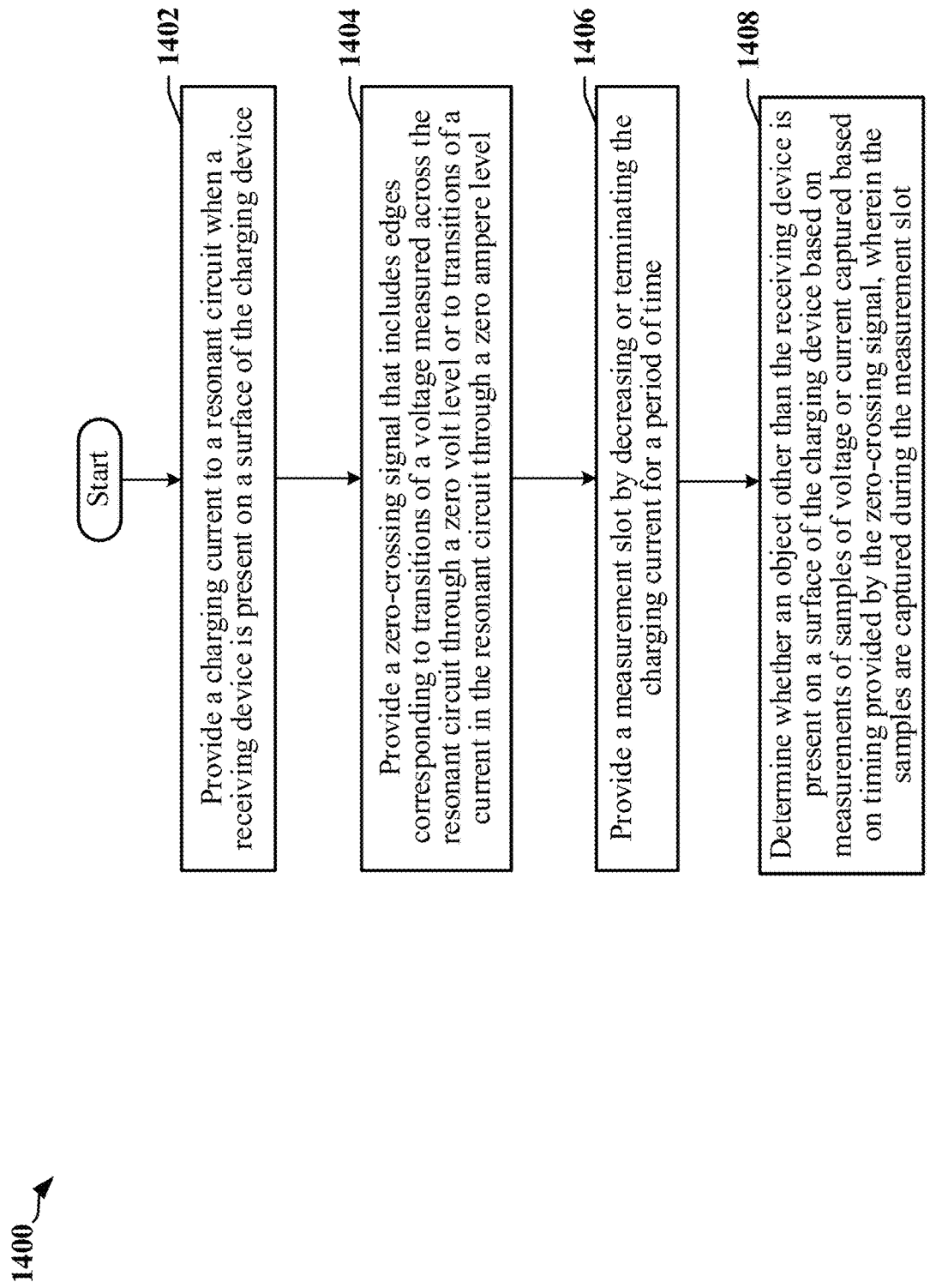
FIG. 14 illustrates a method for operating a charging device in accordance with certain aspects of this disclosure.

FIG. 14 is a flowchart 1400 illustrating a method for operating a charging device in accordance with certain aspects of this disclosure. The method may be performed by a controller in the charging device. At block 1402, the controller may provide a charging current to a resonant circuit when a receiving device is present on a surface of the wireless charging device. At block 1404, the controller may provide a zero-crossing signal that includes edges corresponding to transitions of a voltage measured across the resonant circuit through a zero volt level or to transitions of a current in the resonant circuit through a zero ampere level. At block 1406, the controller may provide a measurement slot by decreasing or terminating the charging current for a period of time. At block 1408, the controller may determine whether an object other than the receiving device is present on a surface of the charging device based on measurements of samples of voltage or current captured based on timing provided by the zero-crossing signal. The samples may be captured during the measurement slot.

In one example, the zero volt level corresponds to a current amplitude midway between maximum and minimum amplitudes of an AC current measured in the resonant circuit. In another example, the zero volt level corresponds to a voltage level midway between maximum and minimum amplitudes of an AC voltage measured across the resonant circuit.

In some instances, it may be determined that the object other than the receiving device is present on the surface of the charging device based on a rate of decrease in voltage or current measured using the samples of voltage or current.

In some instances, it may be determined that the object other than the receiving device is present on the surface of the charging device based on a rate of decrease of energy stored in the resonant circuit. The energy stored in the resonant circuit may be indicated by the samples of voltage and/or current.

In some instances, it may be determined that the object other than the receiving device is present on the surface of the charging device based on a Q factor of the resonant circuit. The Q factor of the resonant circuit may be indicated by a plurality of the samples of voltage or current.

In certain examples, the voltage or current in the resonant circuit may be sampled after a delay following each of a plurality of edges in the zero-crossing signal to obtain the samples of voltage or current. The delay may be calculated to cause sampling of the voltage or current when the voltage or current has a maximum amplitude.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:
1. A method for operating a wireless charging device, comprising:
providing a charging current to a resonant circuit when a receiving device is present on a surface of the wireless charging device;

providing a zero-crossing signal that includes edges corresponding to transitions of a voltage measured across the resonant circuit through a zero volt level or to transitions of a current in the resonant circuit through a zero ampere level;

providing a measurement slot by decreasing or terminating the charging current for a period of time;

sampling the voltage or current in the resonant circuit after a delay following each of a plurality of edges in the zero-crossing signal to obtain samples of voltage or current; and determining whether an object other than the receiving device is present on a surface of the wireless charging device based on measurements of the samples of voltage or current captured based on timing provided by the zero-crossing signal, wherein the samples of voltage or current are captured during the measurement slot.

2. The method of claim 1, wherein the zero volt level corresponds to a current amplitude midway between maximum and minimum amplitudes of an alternating current (AC) measured in the resonant circuit.

3. The method of claim 1, wherein the zero volt level corresponds to a voltage level midway between maximum and minimum amplitudes of an AC voltage measured across the resonant circuit.

4. The method of claim 1, further comprising:
determining that the object other than the receiving device is present on the surface of the wireless charging device based on a rate of decrease in voltage or current measured using the samples of voltage or current.

5. The method of claim 1, further comprising:
determining that the object other than the receiving device is present on the surface of the wireless charging device based on a rate of decrease of energy stored in the resonant circuit, wherein the energy stored in the resonant circuit is indicated by the samples of voltage or current.

6. The method of claim 1, further comprising:
determining that the object other than the receiving device is present on the surface of the wireless charging device based on a Q factor of the resonant circuit, wherein the Q factor of the resonant circuit is indicated by a plurality of the samples of voltage or current.

7. The method of claim 1, wherein the delay is calculated to cause sampling of the voltage or current when the voltage or current has a maximum amplitude.

8. A charging device, comprising:
a resonant circuit comprising a transmitting coil;
a driver circuit configured to provide a charging current to the resonant circuit;
a zero-crossing detector configured to provide a zero-crossing signal that includes edges corresponding to transitions of a voltage measured across the resonant circuit through a zero volt level or corresponding to transitions of a current in the resonant circuit through a zero ampere level;
a sample and hold circuit configured to sample voltage or current in the resonant circuit after a delay following each of a plurality of edges in the zero-crossing signal to obtain samples of voltage or current and
a controller configured to:
cause the driver circuit to provide the charging current to the resonant circuit when a receiving device is present on a surface of the charging device;
provide a measurement slot by causing the driver circuit to decrease or terminate the charging current for a period of time; and
determine whether an object other than the receiving device is present on a surface of the charging device based on measurements of the samples of voltage or current captured based on timing provided by the zero-crossing signal, wherein the samples of voltage or current are captured during the measurement slot.

9. The charging device of claim 8, wherein the zero volt level corresponds to a current amplitude midway between maximum and minimum amplitudes of an alternating current (AC) measured in the resonant circuit.

10. The charging device of claim 8, wherein the zero volt level corresponds to a voltage level midway between maximum and minimum amplitudes of an AC voltage measured across the resonant circuit.

11. The charging device of claim 8, wherein the controller is further configured to:
determine that the object other than the receiving device is present on the surface of the charging device based on a rate of decrease in voltage or current measured using the samples of voltage or current.

12. The charging device of claim 8, wherein the controller is further configured to:
determine that the object other than the receiving device is present on the surface of the charging device based on a rate of decrease of energy stored in the resonant circuit, wherein the energy stored in the resonant circuit is indicated by the samples of voltage or current.

13. The charging device of claim 8, wherein the controller is further configured to:
determine that the object other than the receiving device is present on the surface of the charging device based on a Q factor of the resonant circuit, wherein the Q factor of the resonant circuit is indicated by a plurality of the samples of voltage or current.

14. The charging device of claim 8, wherein the delay is calculated to cause sampling of the voltage or current when the voltage or current has a maximum amplitude.

15. A non-transitory processor-readable storage medium having instructions stored thereon which, when executed by at least one processor of a processing circuit, cause the processing circuit to:
provide a charging current to a resonant circuit when a receiving device is present on a surface of a wireless charging device;
provide a zero-crossing signal that includes edges corresponding to transitions of a voltage measured across the resonant circuit through a zero volt level or to transitions of a current in the resonant circuit through a zero ampere level;
provide a measurement slot by decreasing or terminating the charging current for a period of time;
sample the voltage or current in the resonant circuit after a delay following each of a plurality of edges in the zero-crossing signal to obtain the samples of voltage or current; and
determine whether an object other than the receiving device is present on a surface of the wireless charging device based on measurements of samples of voltage or current captured based on timing provided by the zero-crossing signal, wherein the samples of voltage or current are captured during the measurement slot.

16. The non-transitory processor-readable storage medium of claim 15, wherein the instructions further cause the processing circuit to:
determine that the object other than the receiving device is present on the surface of the wireless charging device based on a rate of decrease in energy, voltage or current measured using the samples of voltage or current.

17. The non-transitory processor-readable storage medium of claim 15, wherein the instructions further cause the processing circuit to:
   determine that the object other than the receiving device is present on the surface of the wireless charging device based on a Q factor of the resonant circuit, wherein the Q factor of the resonant circuit is indicated by a plurality of the samples of voltage or current.

* * * * *